United States Patent
Fujita et al.

(10) Patent No.: US 8,528,982 B2
(45) Date of Patent: Sep. 10, 2013

(54) SEAT

(75) Inventors: Etsunori Fujita, Hiroshima (JP); Yumi Ogura, Hiroshima (JP); Seiji Kawasaki, Hiroshima (JP); Eiji Sugimoto, Hiroshima (JP); Soichi Makita, Hiroshima (JP); Yasuhide Takata, Hiroshima (JP); Shigeru Maeda, Hiroshima (JP); Ryoji Matsukawa, Hiroshima (JP); Hideyuki Yamane, Hiroshima (JP); Seiya Yoshida, Hiroshima (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 183 days.

(21) Appl. No.: 12/994,839

(22) PCT Filed: May 28, 2009

(86) PCT No.: PCT/JP2009/059784
§ 371 (c)(1),
(2), (4) Date: Feb. 15, 2011

(87) PCT Pub. No.: WO2009/145261
PCT Pub. Date: Dec. 3, 2009

(65) Prior Publication Data
US 2011/0169317 A1    Jul. 14, 2011

(30) Foreign Application Priority Data
May 28, 2008    (JP) .................................. 2008-139454

(51) Int. Cl.
*A47C 7/02*    (2006.01)

(52) U.S. Cl.
USPC ............... 297/452.2; 297/452.18; 297/452.25

(58) Field of Classification Search
USPC .................. 297/452.18, 452.2, 452.25, 218.1, 297/218.3, 218.5, 228.13, 452.56, 452.59
See application file for complete search history.

(56) References Cited

U.S. PATENT DOCUMENTS 2,097,976 A    11/1937    Haberstump
3,928,898 A *  12/1975    Smoot ........................ 297/218.1
(Continued)

FOREIGN PATENT DOCUMENTS

EP    0 065 116 A1    11/1982
EP    0 065 116 B1    11/1982
(Continued)

OTHER PUBLICATIONS

International Search Report issued Aug. 25, 2009 in PCT/JP09/59784 filed May 28, 2009.
(Continued)

*Primary Examiner* — David Dunn
*Assistant Examiner* — Alexander Harrison
(74) *Attorney, Agent, or Firm* — Oblon, Spivak, McClelland, Maier & Neustadt, L.L.P.

(57) ABSTRACT

A seat has a configuration in which, in each side frame of a cushion frame, an inner frame and an outer frame which have flanges extending along peripheral edges thereof are faced to each other with a space therebetween at least partially, and the flanges are fixed by hemming process along the entire peripheral edges thereof. Since the entire peripheral edges are hemmed, the inner frame and the outer frame are securely fixed. Additionally, since the inner frame and the outer frame which are thin-plate-shaped are used, reduction in weight of each side frame can be achieved. Further, since the inner frame and the outer frame are faced to each other with a space therebetween at least partially, a compressive/tensile strength required as a side frame can be secured by inserting an expanded bead body into the space.

13 Claims, 10 Drawing Sheets

(56) References Cited

U.S. PATENT DOCUMENTS

| | | | |
|---|---|---|---|
| 5,249,841 A * | 10/1993 | Chales | 297/452.18 |
| 5,490,718 A * | 2/1996 | Akizuki et al. | 297/452.49 |
| 5,568,961 A | 10/1996 | Colasanti | 297/362.12 |
| 6,048,033 A * | 4/2000 | Sakurai et al. | 297/452.18 |
| 6,082,823 A * | 7/2000 | Aumont et al. | 297/452.2 |
| 6,132,003 A * | 10/2000 | Sakurai et al. | 297/452.18 |
| 6,739,673 B2 * | 5/2004 | Gupta et al. | 297/452.65 |
| 6,997,515 B2 * | 2/2006 | Gupta et al. | 297/452.18 |
| 7,063,382 B2 * | 6/2006 | Ali et al. | 297/217.3 |
| 7,093,901 B2 * | 8/2006 | Yamada | 297/367 R |
| 7,201,447 B2 * | 4/2007 | Yamada | 297/367 R |
| 7,303,229 B2 * | 12/2007 | Fujita et al. | 297/216.14 |
| 7,731,292 B2 * | 6/2010 | Ishijima et al. | 297/452.18 |
| 7,971,939 B2 * | 7/2011 | Fujita et al. | 297/452.56 |
| 8,047,605 B2 * | 11/2011 | Yamazaki et al. | 297/216.1 |
| 2002/0135222 A1 * | 9/2002 | Matsunuma | 297/483 |
| 2003/0062754 A1 * | 4/2003 | Yamada | 297/354.1 |
| 2003/0075968 A1 * | 4/2003 | Gupta et al. | 297/452.18 |
| 2006/0103228 A1 * | 5/2006 | Gupta et al. | 297/452.65 |
| 2007/0152489 A1 * | 7/2007 | Ishizuka | 297/411.32 |
| 2008/0100116 A1 * | 5/2008 | Orzelski | 297/391 |
| 2009/0179477 A1 * | 7/2009 | Yamazaki et al. | 297/452.18 |
| 2010/0187881 A1 * | 7/2010 | Fujita et al. | 297/284.3 |
| 2012/0217775 A1 * | 8/2012 | Fujita et al. | 297/216.13 |

FOREIGN PATENT DOCUMENTS

| | | |
|---|---|---|
| JP | 1 90446 | 6/1989 |
| JP | 2002 283891 | 10/2002 |
| JP | 2002 345593 | 12/2002 |
| JP | 2003 70588 | 3/2003 |

OTHER PUBLICATIONS

The Extended European Search Report issued Jan. 19, 2012, in Application No. / Patent No. 09754769.9-2313/2281486.

Communication pursuant to Rules 70(2) and 70a(2) EPC issued Feb. 7, 2012, in Application No. / Patent No. 09754769.9-2313/2281486.

* cited by examiner

SEAT

TECHNICAL FIELD

The present invention relates to a seat used as a seat for a vehicle such as an airplane, a train, or an automobile, or an office chair, or the like.

BACKGROUND ART

In recent years, in view of improvement of fuel efficiency or the like, expectations of weight reduction of a vehicle such as a vehicle body or an airframe have increased. For this reason, a technique to use a three-dimensional solid knitted fabric, which is lighter than urethane foam, as a cushioning member even in a seat used in those vehicles, or the like, has also been considered. However, not only such weight reduction of a cushioning member, but also further thinning of a metal plate used as a frame can also be thought as a way to reduce the weight of a seat. That is, a frame is made by making two thin metal plates face each other and joining their end edge portions to each other, but, in a case where such a frame made of thin metal plates (a thin plate frame) is used, trying to couple the thin plate frames each having a thickness of, for example, 1.0 mm or less, with each other by welding is likely to cause material degradation or a welding defect, since the heat capacity is high. On the other hand, in view of troublesome work, time, and costs for welding thin plate frames, a technique to perform hemming process on a pan frame at an end edge is disclosed in Patent Document 1.

CITATION LIST

Patent Literature

Patent Document 1: Japanese Utility Model Application Laid-open No. H01-90446

SUMMARY OF INVENTION

Technical Problem

Hemming process can not only couple the thin plate frames together, but also has the advantage that, since even the thin plate frames are three-layered at end edges hemmed, a crack or a break are hard to occur from the end edges. In Patent Document 1, however, only applying the technique for the hemming process to a pan frame is described.

By the hemming process, though strength of the thin plate frames is increased at the end edges, strengths at portions other than the end edges cannot sufficiently be secured due to the thickness or material of the thin plate frames in some cases.

The present invention has been made in view of the above, and an object thereof is to provide a seat in which a hemming process technique is applied to a frame other than a pan frame, and further in which strengths not only at end edges subjected to hemming process but also at the other portions can be increased.

Solution to Problem

In order to solve the above problem, the present invention provides a seat provided with a seat cushion section and a seat back section, wherein in each side frame of a cushion frame disposed in the seat cushion section, an inner frame and an outer frame which are thin-plate-shaped and have flanges extending along peripheral edges thereof are faced to each other with a space therebetween at least partially, and the flanges are fixed to each other along the entire peripheral edges by hemming process.

It is preferred that an expanded bead body is inserted in the space between the inner frame and the outer frame that configures each side frame of the cushion frame, and the expanded bead body and the inner frame or the outer frame are at least partially stuck to each other on faces thereof opposite to each other. It is preferred that the inner frame and the outer frame configuring each side frame of the cushion frame are fixed at at least one point by a fastening member. It is preferred that the flanges hemmed of the inner frame and the outer frame configuring each side frame of the cushion frame are at least partially fixed to each other by adhesive, filler, or caulking. It is preferred that at least one of the inner frame and the outer frame configuring each side frame of the cushion frame is thermally treated.

Further, the present invention provides a seat provided with a seat cushion section and a seat back section, wherein in each side frame of a back frame disposed in the seat back section, an inner frame and an outer frame which are thin-plate-shaped and have flanges extending along peripheral edges thereof except upper end edges thereof are faced to each other with a space therebetween at least partially, and the flanges are fixed to each other along the entire peripheral edges except the upper end edges by hemming process.

It is preferred that a pipe frame is disposed in the space of each side frame of the back frame. It is preferred that the pipe frame is disposed so as to be positioned in the space of each side frame of the back frame on near and far sides of each side frame through an upper end opening portion. It is preferred that the pipe frame is partially fixed on an inner face of the side frame. It is preferred that an expanded bead body is inserted in the space between the inner frame and the outer frame that configures each side frame of the back frame, and the expanded bead body and the inner frame or the outer frame are at least partially stuck to each other on faces thereof opposite to each other. It is preferred that the inner frame and the outer frame configuring each side frame of the back frame are fixed at at least one point by a fastening member. It is preferred that the flanges hemmed of the inner frame and the outer frame configuring each side frame of the back frame are at least partially fixed to each other by adhesive, filler, or caulking. It is preferred that at least one of the inner frame and the outer frame configuring each side frame of the back frame is thermally treated.

Advantageous Effects of Invention

The seat according to the present invention has a configuration in which, in each side frame of a cushion frame, an inner frame and an outer frame which have flanges extending along peripheral edges thereof are faced to each other with a space therebetween at least partially, and the flanges are fixed along the entire peripheral edges thereof by hemming process. Since the entire peripheral edges are hemmed, the inner frame and the outer frame are securely fixed. In addition to this, since the inner frame and the outer frame are fixed to each other at at least one point by a fastening member, or the flanges hemmed are at least partially fixed to each other by adhesive, filler, or caulking, the inner frame and the outer frame are further securely fixed to each other. Additionally, since the inner frame and the outer frame which are thin-plate-shaped are used, reduction in weight of each side frame can be achieved. Further, since the inner frame and the outer frame are faced to each other with a space therebetween at least partially in order to increase in section modulus, a compressive/tensile strength required as a side frame can be secured by inserting an expanded bead body into the space. Incidentally, it is preferred that the inner frame and the outer frame have the space therebetween within as wide a facing range as possible. Thereby, a range in which the expanded bead body can be inserted in the space is increased, which results in improvement in strength. On the other hand, the expanded bead body is very light, and therefore it does not cause a large increase in weight. Further, since the flanges are subjected to hemming process, even thin plate frames obtain a three-layered medium thick plate structural body extending along the flanges hemmed, which results in increase in rigidity, and which makes a crack or a break from the peripheral edges unlikely.

Further, since each side frame of a back frame having a cantilever support structure normally is similarly formed from a thin-plate-shaped inner frame and a thin-plate-shaped outer frame, and these frames are fixed to each other by hemming process, weight reduction of the side frame can also be achieved even in the back frame. Further, when the hemming process is applied to form the side frame of the back frame, an upper end edge of the side frame is opened without applying the hemming process to the upper end edge, so that a pipe frame can be arranged inside the side frame. Then, this arrangement of the pipe frame inside the side frames can increase the strength of the back frame.

DESCRIPTION OF EMBODIMENTS

Figure 1:
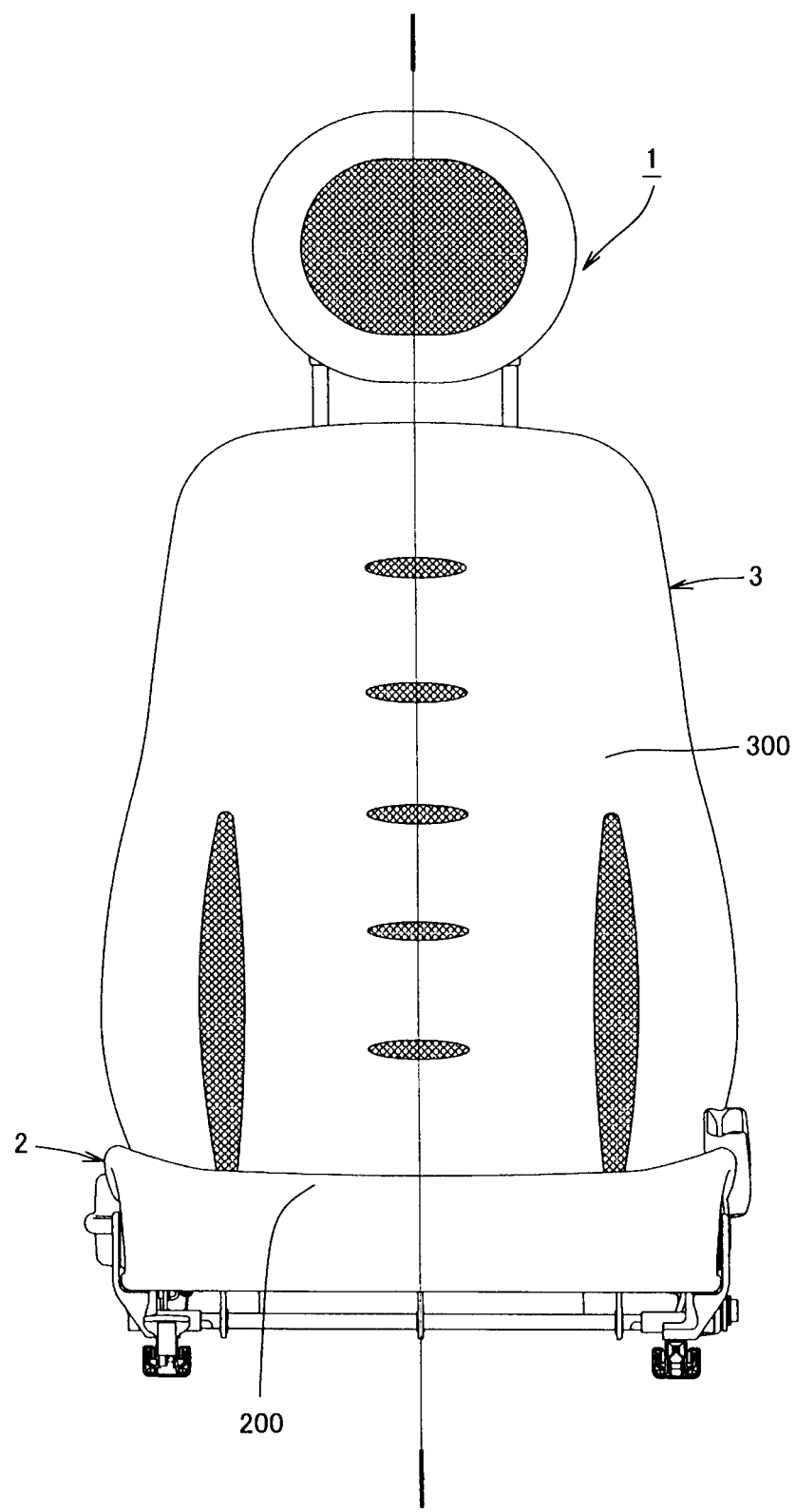
FIG. 1 is a front view of a seat according to an embodiment of the present invention.
Figure 2:
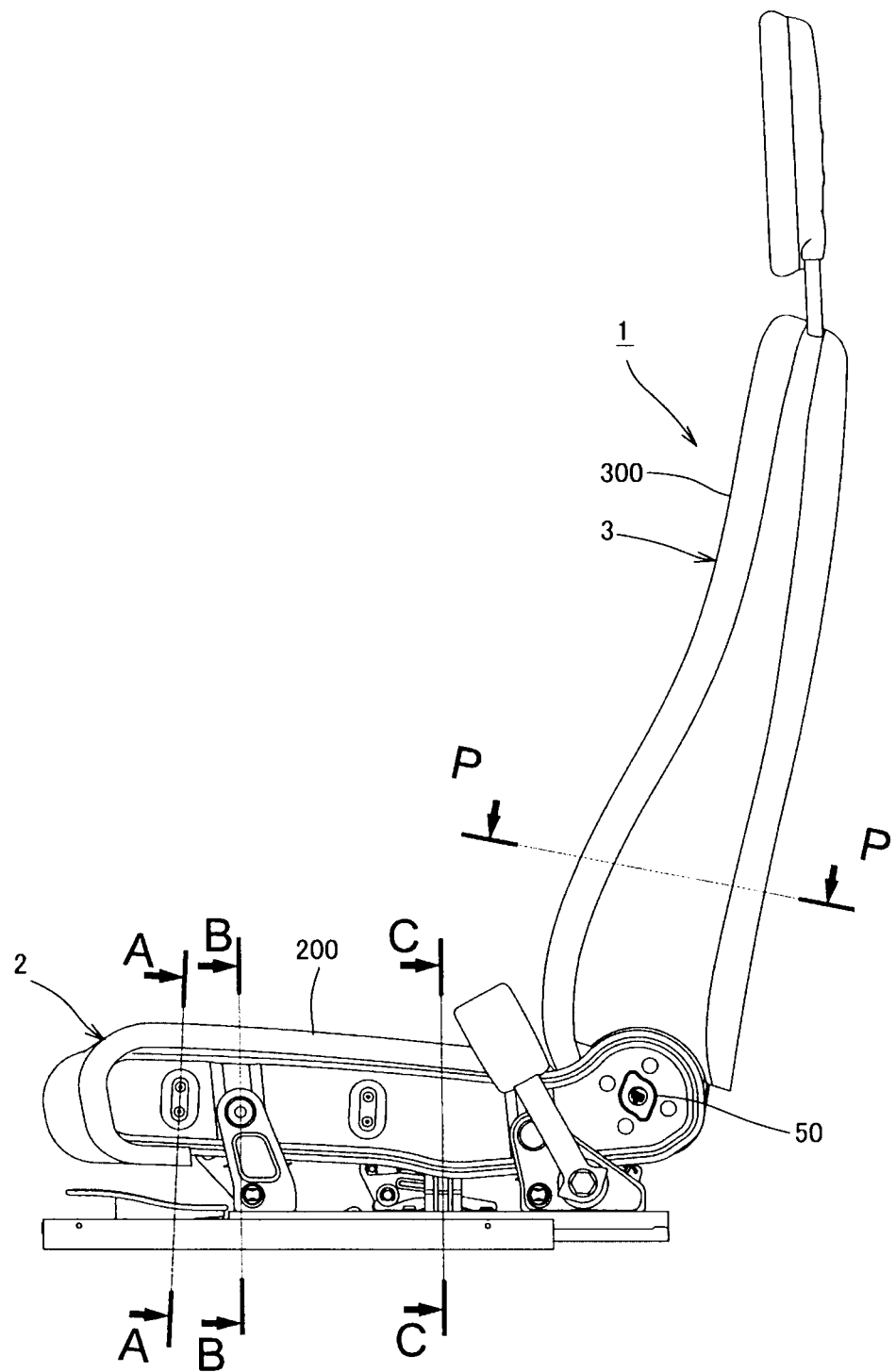
FIG. 2 is a side view of a seat according to an embodiment of the present invention.
Figure 3:
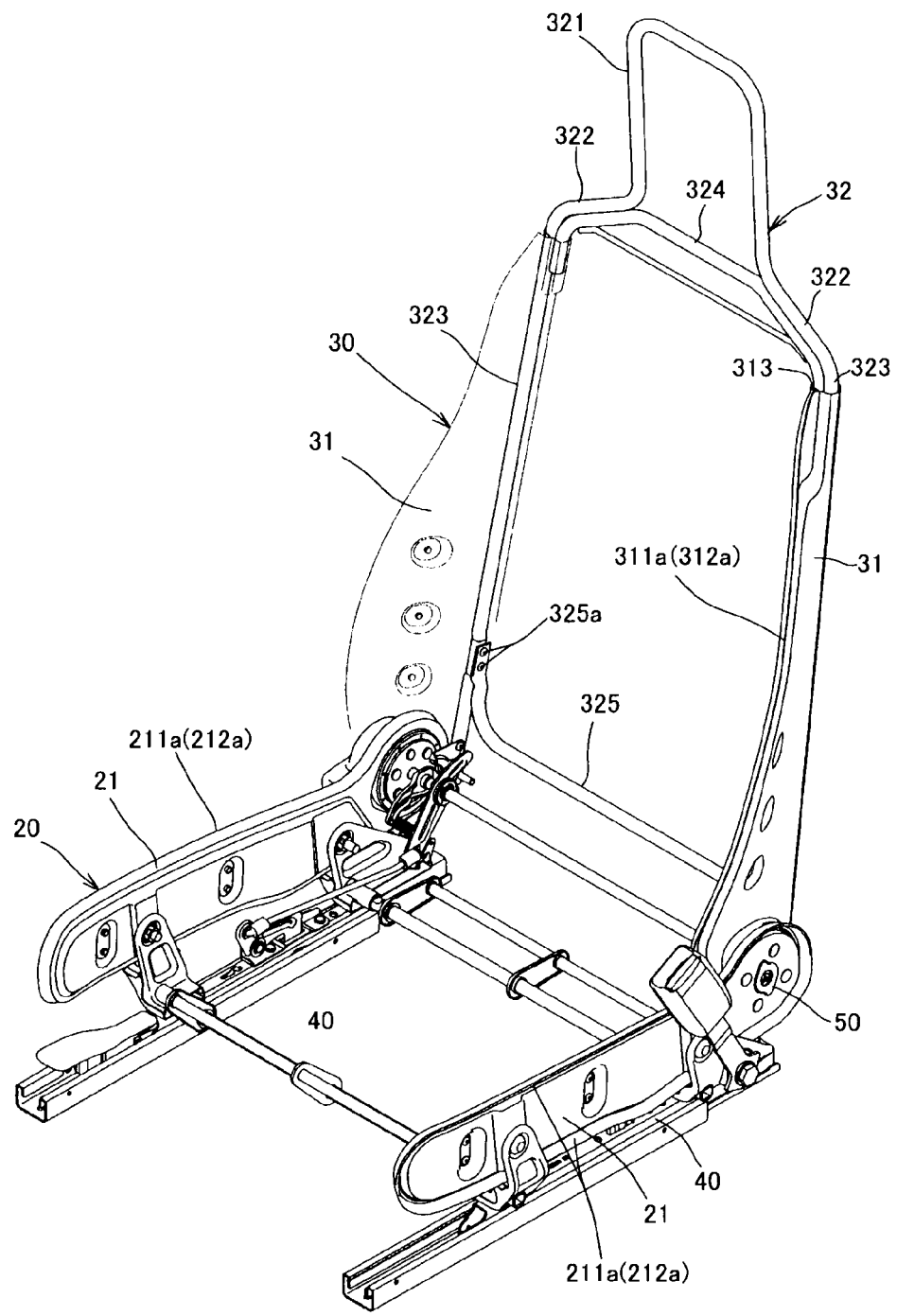
FIG. 3 is a view showing a frame structure of a seat according to the above embodiment.

Hereinafter, embodiments of the present invention will be further explained in detail with reference to the drawings. FIG. 1 is a front view of a seat 1 according to the embodiment, FIG. 2 is a side view thereof, and FIG. 3 is a view showing a frame structure of the seat 1. As shown in these figures, the seat 1 is configured to be provided with a seat cushion section 2 and a seat back section 3. The seat cushion section 2 is configured to be provided with a cushion frame 20 and a cushioning member 200 supported by the cushion frame 20, and the seat back section 3 is configured to be provided with a back frame 30 and a cushioning member 300 supported by the back frame 30. The cushioning members 200 and 300 are stretched on the cushion frame 20 and the back frame 30 so as to be provided as tensile structural bodies. For example, a two-dimensional net, a three-dimensional solid knitted fabric, an expanded bead body to a surface of which a thin high-density urethane coating is applied, an expanded bead body covered with an elastic covering material with high stretching properties or a covering material with low stretching properties and high rigidity, any combination of these materials, or the like can be used.

The cushion frame 20 is configured to have two side frames 21 supported by right and left slide adjusters 40, respectively. The side frame 21 comprises an inner frame 211 and an outer frame 212, as shown in FIG. 3 to FIG. 7. Both the inner frame 211 and the outer frame 212 are formed from a thin plate with predetermined width and length, and formed into an approximately shallow U shape in section, and the respective peripheral edges thereof are provided with flanges 211a, 212a extending outward.

The inner frame 211 and the outer frame 212 are fixed to each other with their inner faces faced to each other and with the flanges 211a, 212a stacked on each other. Since the inner frame 211 and the outer frame 212 are formed into an approximately shallow U shape in section, as described above, a space is formed between them by making the inner faces thereof face each other. The space needs to be formed at least partially within a facing range in which the inner frame 211 and the outer frame 212 face each other, but, as described later, since a foamed bead body 220 is inserted into the space, it is preferred that the inner frame 211 and the outer frame 212 have the space therebetween within as wide the facing range as possible. The flange 211a of the inner frame 211 is formed so as to extend outward longer than the flange 212a of the outer frame 212, so that hemming process is performed by stacking them on each other, causing a jig for roller hemming to abut onto the flange 212a of the outer frame 212, and folding the flange 211a of the inner frame 211 from one side to the other side of the flange 212a of the outer frame 212. Thereby, the flanges 211a and 212a joined together by hemming process are subjected to hemming process in an outward-bent state.

Figure 4:
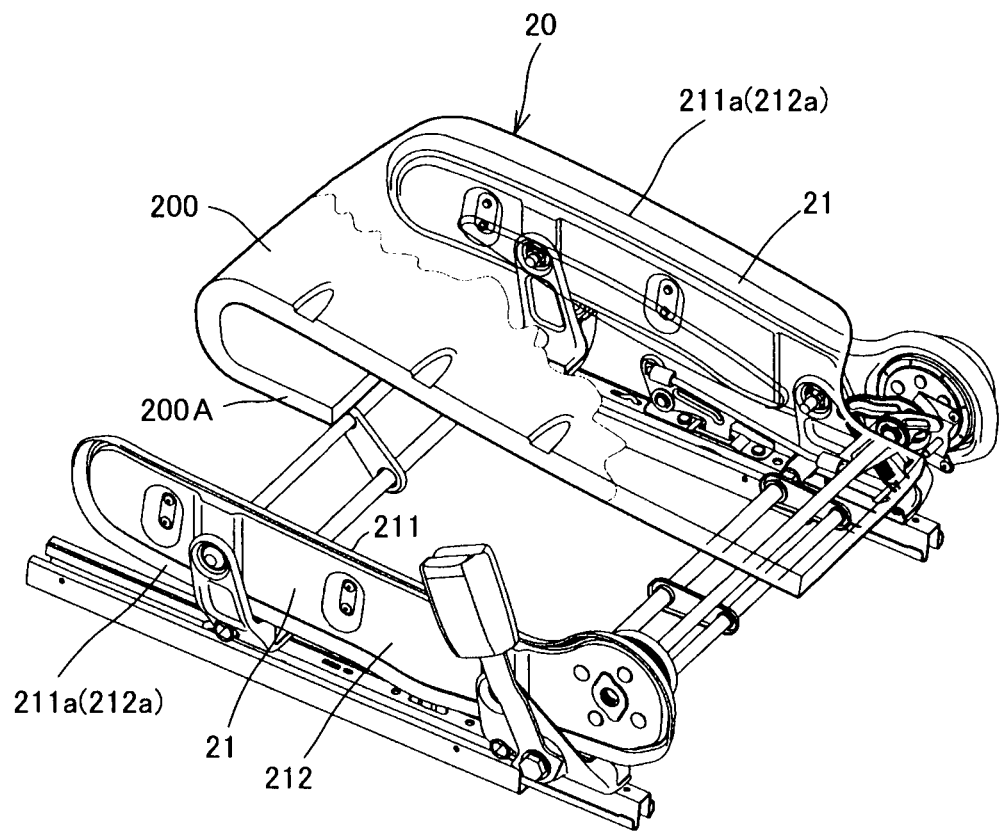
FIG. 4 is a view showing a structure of a cushion frame of a seat according to the above embodiment.

According to the embodiment, as shown in FIG. 4, the inner frame 211 and the outer frame 212 are integrated with each other by hemming process over their entire peripheral edges. That is, portions of the inner frame 211 and the outer frame 212 subjected to hemming process are continuing in a circle, so that the inner frame 211 and the outer frame 212 are not deviated from each other. Therefore, even if thin plates which are not suitable for welding or the like are used as the inner frame 211 and the outer frame 212, they can reliably be joined together, so that thin plates having a thickness of 1.0 mm or less, or further thin plates having a thickness of 0.5 mm or less can be used, which contributes to weight reduction. Further, since a portion comprising the flanges 211a and 212a has a three-layer structure so that strength thereof is increased, a crack can be prevented from occurring from the flanges 211a and 212a even if thin plates are used as the inner frame 211 and the outer frame 212. Incidentally, it is preferred that the inner frame 211 and the outer frame 212 are fixed to each other at at least one portion by a fastening member 230 such as a rivet (see FIG. 5A). Thereby, movement in a triaxial direction and a rotational direction between the inner frame 211 and the outer frame 212 is restricted so that both the inner frame 211 and the outer frame 212 become more unlikely to deviate from each other, and deviation noise is further reduced.

Figure 5:
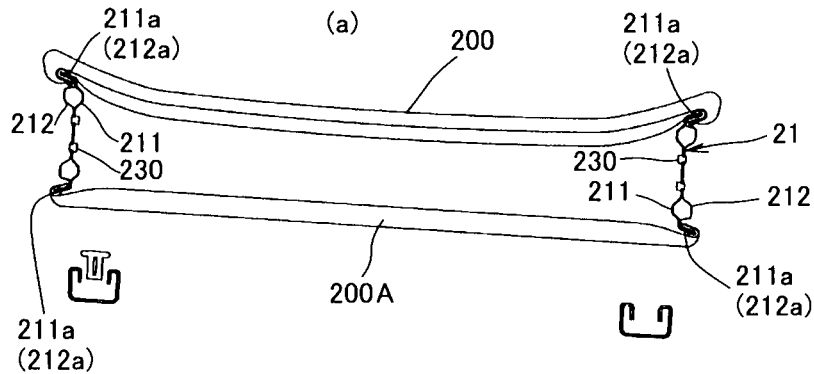
FIG. 5A is a sectional view of the seat taken along line A-A in FIG. 2.
FIG. 5B is a sectional view of the seat taken along line B-B in FIG. 2.
FIG. 5C is a sectional view of the seat taken along line C-C in FIG. 2.
Figure 5:
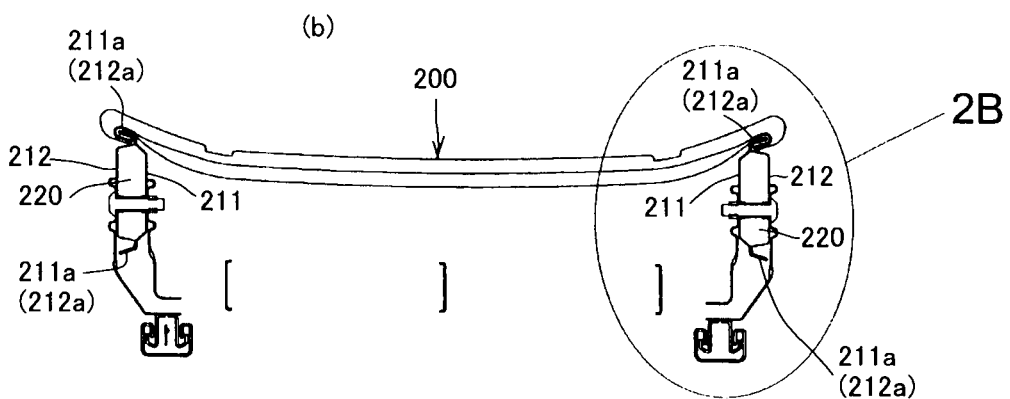
Figure 5:
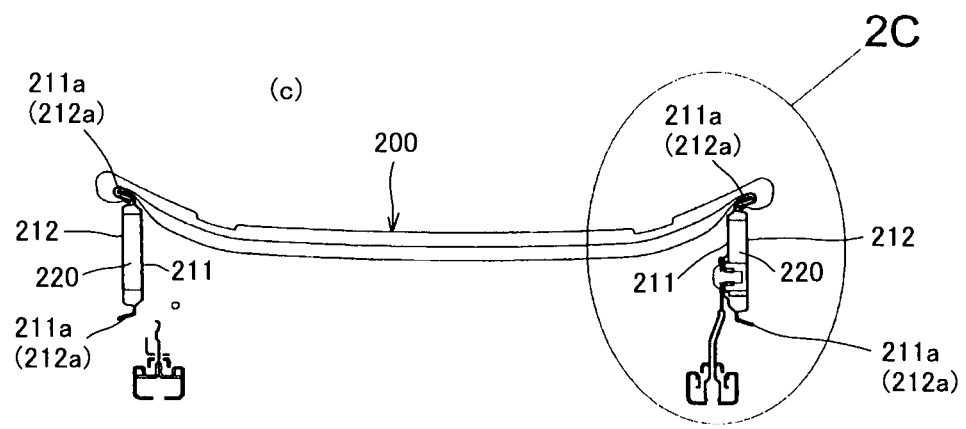
Figure 6:
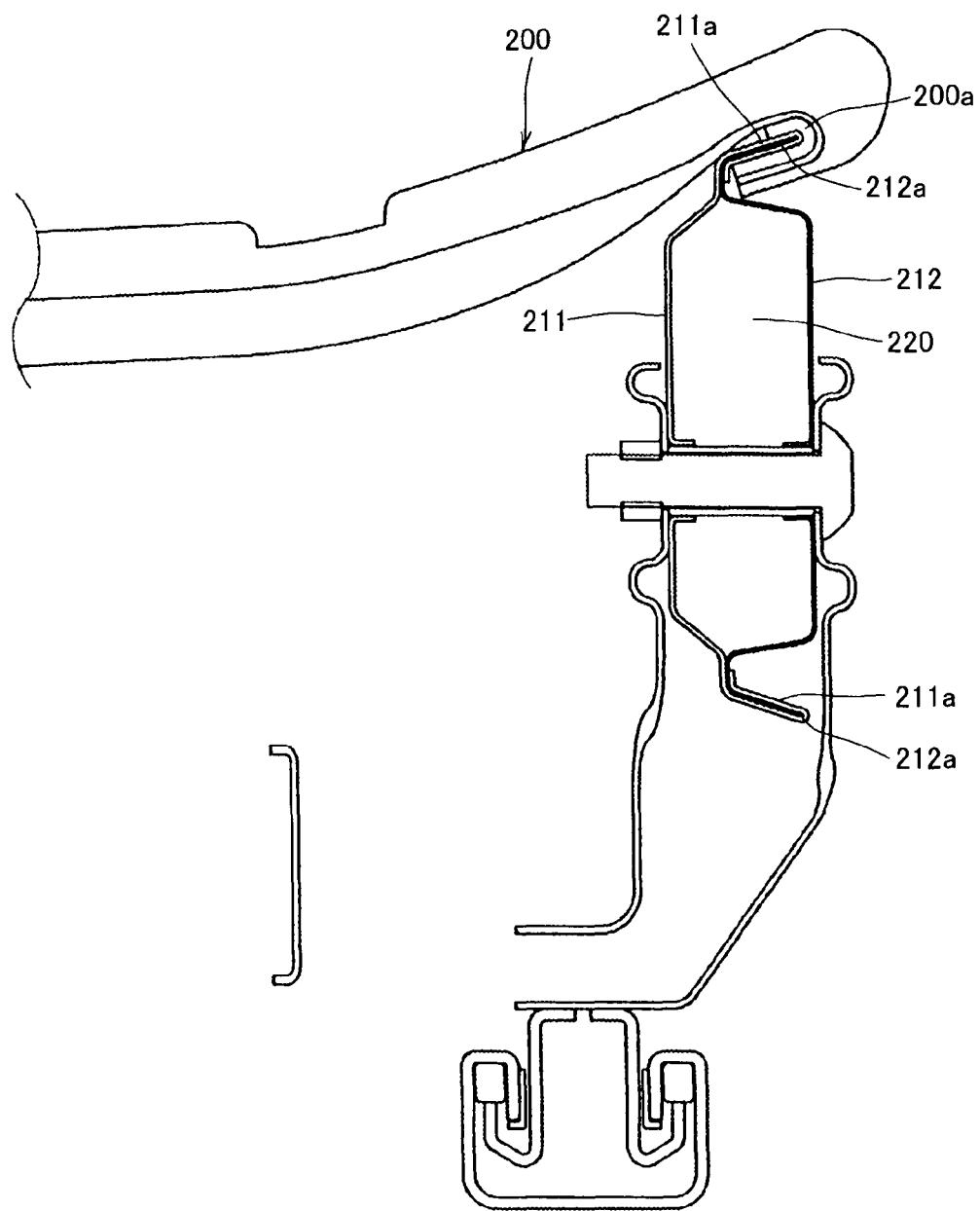
FIG. 6 is an enlarged view of a portion 2B in FIG. 5B.
Figure 7:
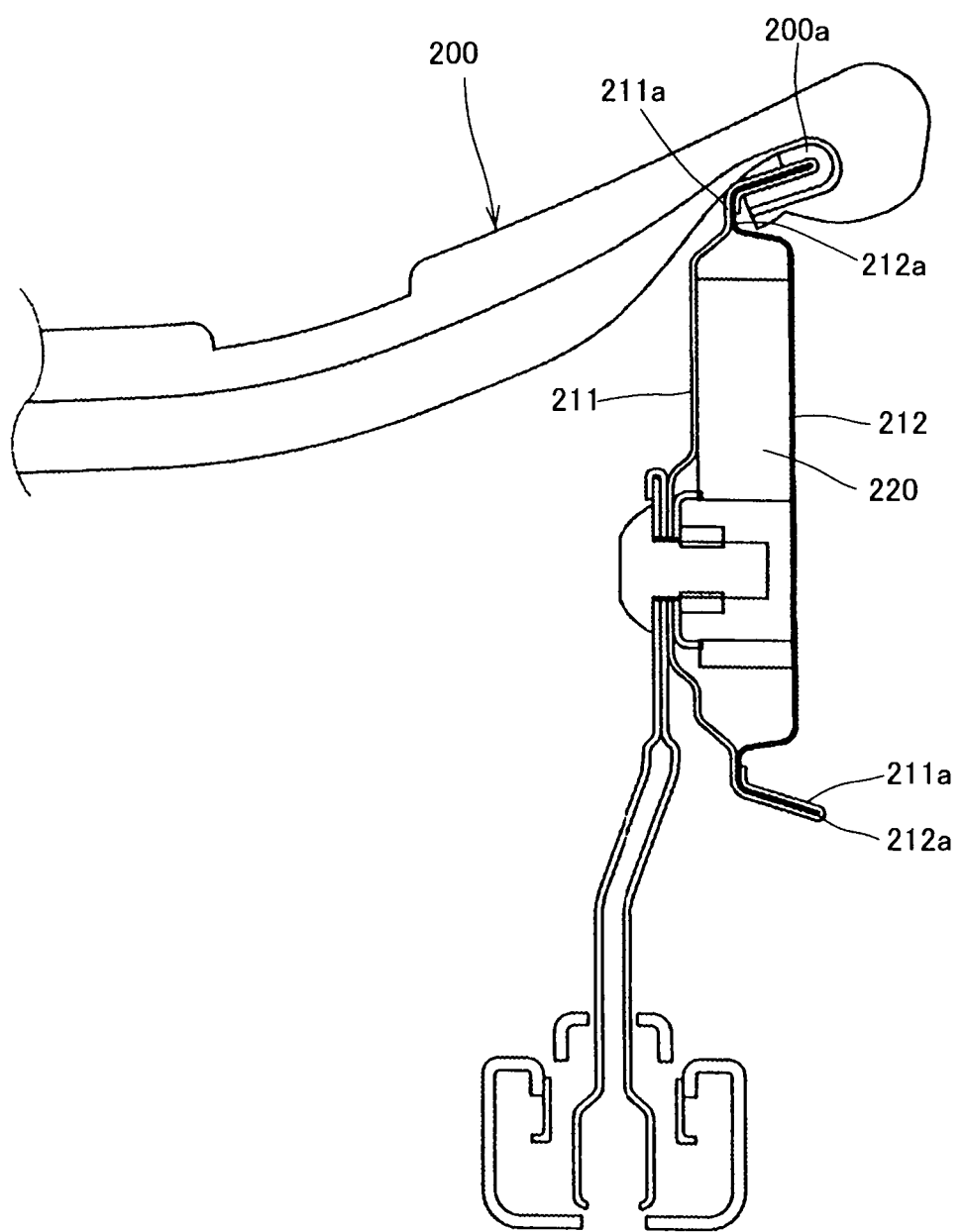
FIG. 7 is an enlarged view of a portion 2C in FIG. 5C.

It is preferred that the expanded bead body 220 is inserted in the space between the inner frame 211 and the outer frame 212, as shown in FIG. 5 to FIG. 7. Regarding the filling range of the expanded bead body 220, it may be filled entirely or partially in the space between the inner frame 211 and the outer frame 212. The filling range of the expanded bead body 220 can arbitrarily be set according to strength or a level of impact absorption required as the side frame 21. Further, it is preferred that each expanded bead body 220 and the inner frame 211 or the outer frame 212 are at least partially stuck to each other on their faces opposite to each other in a compressed state. This improves the unity of the inner frame 211 and the outer frame 212, further prevents them from deviating from each other, and contributes to improvement of rigidity. Further, it is preferred that the expanded bead body 220 and the inner frame 211 or the outer frame 212 are at least partially stuck to each other on their faces opposite to each other. Such effects as improvement of rigidity and reduction of deviation noise are further enhanced.

As the expanded bead body 220, a foamed formation body obtained by applying a bead method to resin containing at least one of polystyrene, polypropylene, and polyethylene is used. Incidentally, an expansion ratio is arbitrary, and an increase in the weight of the side frame 21 due to filling with the expanded bead body 220 is small. Further, even if the expanded bead body 220 is not filled in the space between the inner frame 211 and the outer frame 212, a load is concentrically applied on the flanges 211a, 212a, but, since the flanges 211a and 212a configure a medium thick plate structural body, the strength at the flanges is high. The presence of the expanded bead body 220 increases the unity of the inner frame 211 and the outer frame 212 so that a load to the flanges 211a and 212a is dispersed.

As the expanded bead body 220, a foamed formation body obtained by applying a bead method to resin containing at least one of polystyrene, polypropylene, and polyethylene is used as it is, but it is preferred that the foamed formation body covered with an elastic covering material having high extension percentage and recovery rate is used. As such an elastic covering material, for example, the unwoven fabric where thermoplastic elastomer elastic fibers have been stuck to each other in a melting manner, which is disclosed in JP-A-2007-92217, can be used. Instead of the elastic covering material, a cloth with low stretching properties and high rigidity can also be used to cover the foamed formation body. Further, in accordance with these members, the foamed formation body covered with a heat-resistant cloth can be used.

Here, the flanges 211a and 212a subjected to hemming process to be bent outward function as an engaging portion supporting the cushioning member 200. As shown in FIG. 6 and FIG. 7, each side edge of the cushioning member 200 is provided with an approximately U-shaped engaging plate 200a, and the engaging plate 200a is engaged with the engaging portion comprising the flanges 211a and 212a so that the cushioning member 200 is supported by the side frame 21. In the embodiment, since the flanges 211a and 212a which have been subjected to hemming process in the above manner extend along the entire peripheral edges of the inner frame 211 and the outer frame 212, the cushioning member 200 can be engaged with the flanges 211a and 212a positioned on a bottom side in FIG. 3 and FIG. 4. Therefore, it is preferred that the cushioning member 200 is wrapped in the vicinity of a front edge portion of the seat 1 from the top of the front edge portion to the bottom thereof, and the cushioning member 200 is engaged with the flanges 211a and 212a positioned in the bottom of the seat 1. Thereby, a wrapping portion 200A of the cushioning member 200 wrapped to the bottom of the front edge portion functions as a barrier that prevents a submarine phenomenon. If the cushioning member 200 is stretched only over the top of the side frame 21, inward buckling deformation of the side frame 21 may be caused, but, since the cushioning member 200 is stretched on the top and the bottom of the side frame 21, a balance between the top and the bottom can be achieved by stretching the cushioning member 200 also on the bottom, thereby the inward buckling deformation of the side frame 21 can be suppressed.

Incidentally, a member to be engaged with the flanges 211a and 212a positioned on the bottom of the side frame 21 is not limited to a member integrated with the cushioning member 200 engaged with the flanges 211a and 212a positioned on the top thereof, as described above, but it can be a cloth member, a net member, or another cushioning member formed separately from the cushioning member 200.

Figure 8:
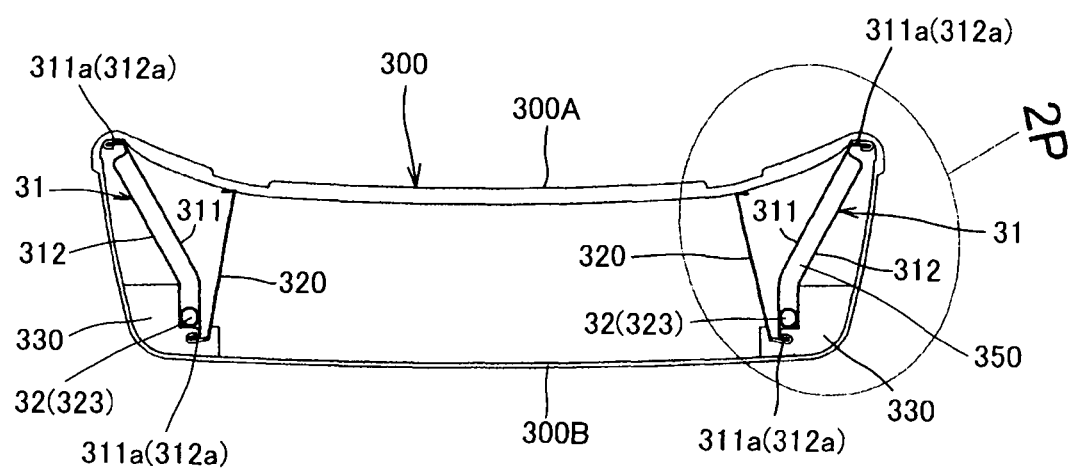
FIG. 8 is a sectional view of the seat taken along line P-P in FIG. 2.
Figure 9:
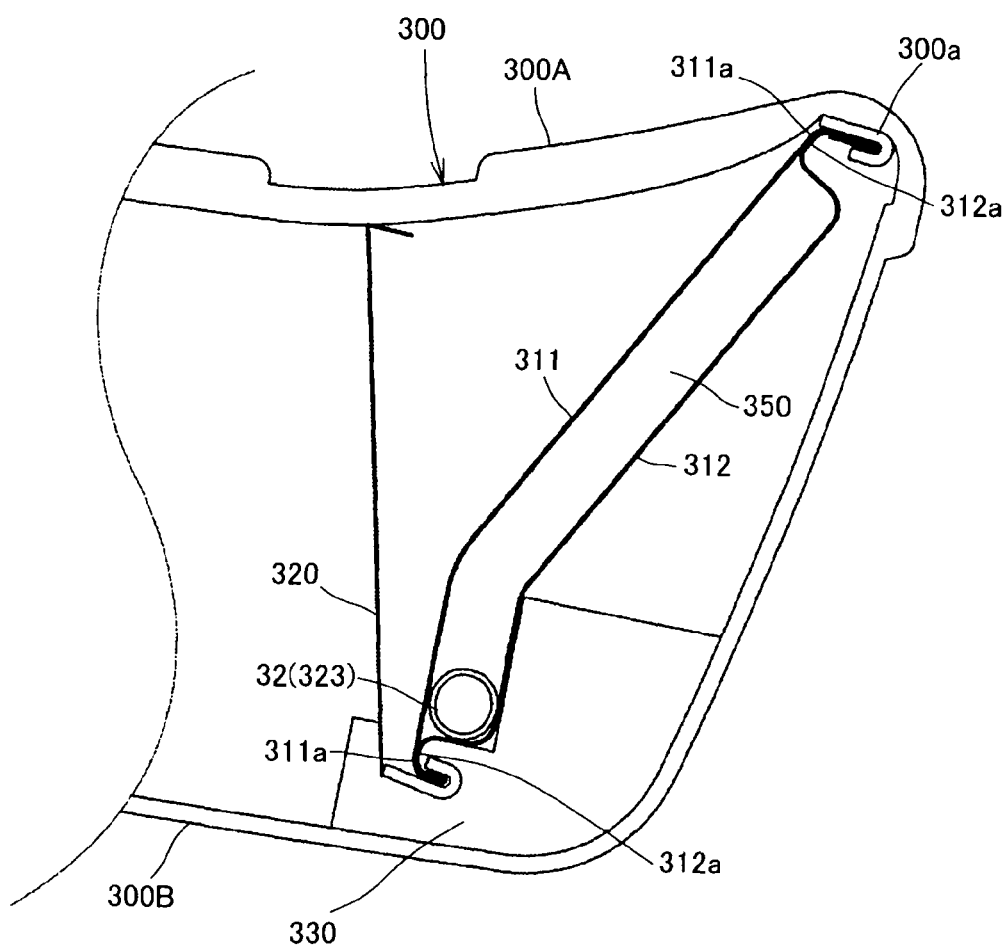
FIG. 9 is an enlarged view of a portion 2P in FIG. 8.

The back frame 30 is configured to have two side frames 31 and a pipe frame 32, as shown in FIG. 3. The side frames 31 are arranged with a predetermined distance in a widthwise direction of the seat 1 from each other, and provided so as to be capable of being inclined with respect to the cushion frame 20 by a reclining mechanism 50. In each side frame 31 of the back frame 30, as shown in FIG. 8 and FIG. 9, an inner frame 311 and an outer frame 312 having an approximately shallow U shape in section are faced to each other with peripheral flanges 311a and 312a stacked on each other, and they are subjected to hemming process such that the flange 311a of the inner frame 311, which extends longer than the flange 312a, surrounds the flange 312a of the outer frame 312. However, since the flanges 311a and 312a are provided on portions other than the respective upper end edges of the inner frame 311 and the outer frame 312, as shown in FIG. 3, a clearance (upper end opening 313) is formed between the upper end edges when the inner frame 311 and the outer frame 312 having an approximately shallow U shape are faced to each other and subjected to hemming process.

Each side frame 31 is arranged such that a plane thereof, which corresponds to the respective widths of the inner frame 311 and the outer frame 312, extends in a front-back direction (depth direction) of the seat 1, and the flanges 311a and 312a joined together by hemming process are bent outward. The flanges 311a, 312a positioned on the front side are engaged with an approximately U-shaped engaging plate 300a provided on each side edge of the cushioning member 300 (see FIG. 9). The cushioning member 300 is also wrapped between the respective side frames 31 on a back face side of the seat back section 3. A cloth member 320 is provided between the flanges 311a and 312a positioned on the rear side and sites on a site 300A of the cushioning member 300, the sites being positioned near the respective side frames 31 and the site 300A being positioned near a front face side of the seat back section 3, and the cloth member 320 pulls the sites on the site 300A positioned near the front face side to form a shape for supporting sides of the body of a seat occupant. An expanded bead body 330, such as polystyrene foam, or the like is provided on outer peripheries of the flanges 311a and 312a positioned on the rear side so that a feeling of contact with the flanges 311 and 312a that a rear seat occupant has when he/she contacts therewith is reduced. The cushioning member 300 is configured as a tensile structural body obtained by stretching a two-dimensional net, a three-dimensional solid knitted fabric, an expanded bead body covered with an elastic covering material, any combination of these, or the like. Therefore, the cushioning member 300 secures a predetermined clearance between the site 300A of the cushioning member 300 positioned on the front face side and a site 300B of the cushioning member 300 positioned on the back face side, and therefore, even if a rear seat occupant pushes the site 300B positioned on the rear face side, the pushing force is prevented from being transmitted to a front seat occupant.

Figure 10:
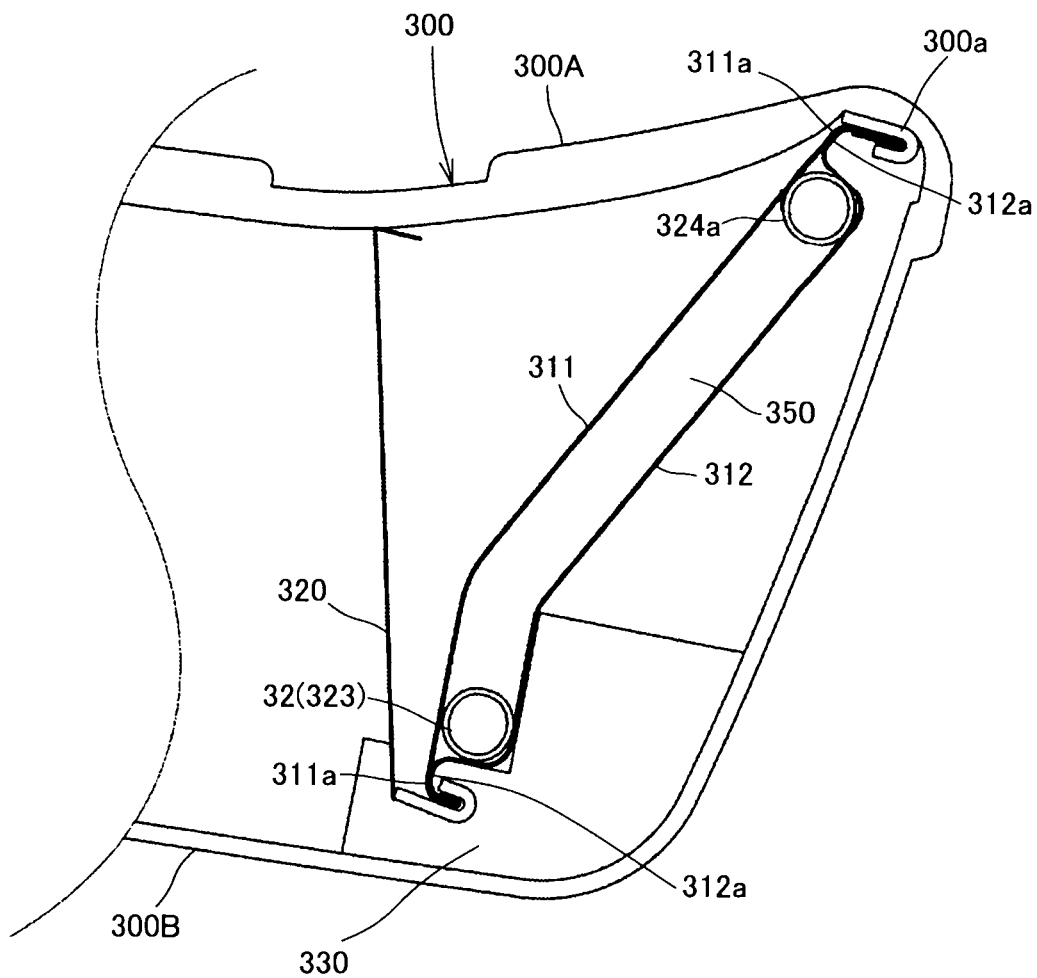
FIG. 10 is a view showing an example of arranging a side pipe portion on a near side (front side) of a side frame configuring a back frame.

As shown in FIG. 3, FIG. 8 and FIG. 9, the pipe frame 32 is configured to have a headrest portion 321, upper pipe portions 322 provided in a widthwise direction near a lower portion of the headrest portion 321, and side pipe portions 323 which extend downward along the respective side frames 31 from the respective ends of the upper pipe portions 322 and which are inserted in the respective side frames 31 through the upper end openings 313 of the respective side frames 31. The pipe frame 32 is also provided with an upper reinforcing pipe 324 which is in partial contact with the upper pipe portions 322 to maintain a width between upper portions of the side frames 31, and a lower reinforcing pipe 325 for maintaining a width between lower portions of the side frames 31. In this embodiment, the side pipe portions 323 are disposed only on far sides (rear sides) in the respective side frames 31, but, in order to improve the strength so that the pipe frame 32 can withstand a larger rearward moment, for example, end portions of the upper reinforcing pipe 324 can be extended downward such that side pipe portions 324a are also disposed on the near sides (front sides) in the respective side frames 31, as shown in FIG. 10. Incidentally, since the back frame 30 has a cantilever support structure, which is different from the cushion frame 20, it is preferred that the side frame 31 has a structure in which the upper end opening 313 is provided, and the side pipe portion 323 is disposed through the upper end opening 313, so that a space is formed between the upper end opening 313 and the side pipe portion 323 to allow deformation of the side pipe portion 323. Further, both end portions of the lower reinforcing pipe 325 are joined to the side frames 31 and the side pipe portions 323 by fastening members 325a such as rivets, as shown in FIG. 3. Therefore, when large impact energy, such as rear impact, is applied to the seat back section, the fastening members are also deformed to fulfill an impact absorbing function.

It is preferred that an expanded bead body 350 is inserted in a space between the inner frame 311 and the outer frame 312 of each side frame 31, as in the case of the side frame 21 of the cushion frame 20 described above. The filling range of the expanded bead body is arbitral, as in the above case. Also, the expanded bead body covered with a heat-resistant cloth or an elastic cloth may be used, as in the above case.

Further, regarding both the cushion frame 20 and the back frame 30, it is preferred that the respective inner frames 211, 311 and the respective outer frames 212 and 312 subjected to thermal treatment are used. Particularly, it is preferred that a duplex grain structure in which large and small crystal grains are mixed or a composite structure in which martensite compositions are compositely formed is obtained by thermal treatment. Thereby, a residual stress field can be formed on the respective surfaces of the inner frames 211 and 311 and the outer frames 212 and 312 that are thin plates, the residual stress field contributing to prevention of deviation of the peripheral edges subjected to hemming process and improvement in rigidity. Incidentally, both the inner frames 211 and 311 and the outer frames 212 and 312 may be subjected to thermal treatment, or either ones of them may be subjected to thermal treatment. For example, it is preferred in some cases that, when ones of the inner frames 211 and 311 and the outer frames 212 and 312 are used as decorative faces, they are not subjected to thermal treatment, and it is preferred in other cases that only ones of them are subjected to thermal treatment according to how to apply a residual stress field.

According to this embodiment, since such a configuration is adopted that the peripheral edges of the side frame 21 of the cushion frame 20 and the side frame 31 of the back frame 30 are subjected to hemming process, preferably expanded bead bodies are filled in between the both (the inner frames and the outer frames of the both side frames), and more preferably the expanded bead bodies are stuck to the inner frames 211 and 311 or the outer frames 212 and 312 and filled therein, a required strength can be secured even though light thin plates are used as the inner frames 211 and 311 and the outer frames 212 and 312, which contributes to weight reduction of the entire seat 1. Further, it is also possible to adopt a configuration that further enhances the strength by arranging at least one pipe frame in the side frame 21 of the cushion frame 20, as in the case of the side frame 31 of the back frame 30.

Incidentally, it is preferred that the flanges 211a and 212a of the inner frame 211 and the outer frame 212 that configure the side frame 21 of the cushion frame 20 subjected to hemming process or the flanges 311a and 312a of the inner frame 311 and the outer frame 312 that configure the side frame 31 of the back frame 30 subjected to hemming process are at least partially fixed by adhesive, filler (silicone resin or the like) or caulking. Thereby, the inner frame 211, 311 and the outer frame 212, 312 are further securely fixed, respectively, which contributes to prevention of deviation between them or improvement in rigidity. However, as described above, this embodiment has the configuration in which the expanded bead bodies 220 and 350 are filled in between the inner frames 211 and 311 and the outer frames 212 and 312, respectively, and the expanded bead bodies 220 and 350 and the inner frames 211 and 311 or the outer frames 212 and 312 are preferably fixed to each other by adhesive. In this embodiment thus configured, reinforcement by fixing the portions subjected to hemming process at least partially by adhesive, filler, or caulking is positioned as a secondary thing, and therefore in some cases it is possible to dispense with the secondary reinforcement.

REFERENCE SIGNS LIST

1 Seat
2 Seat cushion section
3 Seat back section
20 Cushion frame
21 Side frame
211 Inner frame
211a Flange
212 Outer frame
212a Flange
220 Expanded bead body
200 Cushioning member
30 Back frame
31 Side frame
311 Inner frame
311a Flange
312 Outer frame
312a Flange
300 Cushioning member
32 Pipe frame
350 Expanded bead body

The invention claimed is:

1. A seat provided with a seat cushion section and a seat back section, the seat comprising:
   a cushion frame disposed in the seat cushion section, the cushion frame including a pair of side frames, each of the side frames including an inner frame and an outer frame, the inner frame and the outer frame being made of a metal plate and having flanges extending along peripheral edges thereof; and
   a cushion member, the cushion member including at least one approximately U-shaped engaging plate, wherein the inner frame and the outer frame face each other with a space therebetween at least partially, and the flanges of the inner frame and the outer frame are fixed to each other along an entirety of the peripheral edges via a hemming process, wherein an expanded bead body is inserted entirely or partially in the space between the inner frame and the outer frame of each side frame, and the expanded bead body and one of the inner frame and the outer frame are at least partially stuck to each other on faces thereof opposite to each other, wherein the flanges of the inner frame and the outer frame are bent outward with respect to a center of the cushion frame, and wherein the at least one approximately U-shaped engaging plate attaches to the flanges of the inner frame and the outer frame.

2. The seat according to claim 1, wherein the inner frame and the outer frame of each respective side frame of the cushion frame are fixed at at least one point by a fastening member.

3. The seat according to claim 1, wherein the hemmed flanges of the inner frame and the outer frame of each respective side frame of the cushion frame are at least partially fixed to each other by adhesive, filler, or caulking.

4. The seat according to claim 1, wherein at least one of the inner frame and the outer frame of each respective side frame of the cushion frame is thermally treated.

5. A seat provided with a seat cushion section and a seat back section, the seat comprising:
 a back frame disposed in the seat back section, the back frame including a pair of side frames, each of the side frames including an inner frame and an outer frame, the inner frame and the outer frame being made of a metal plate and having flanges extending along peripheral edges thereof except for upper end edges thereof; and
 a cushion member, the cushion member including at least one approximately U-shaped engaging plate,
 wherein the inner frame and the outer frame face each other with a space therebetween at least partially, and the flanges of the inner frame and the outer frame are fixed to each other along an entirety of the peripheral edges, except the upper end edges, via a hemming process,
 wherein an expanded bead body is inserted entirely or partially in the space between the inner frame and the outer frame of each side frame, and the expanded bead body and one of the inner frame and the outer frame are at least partially stuck to each other on faces thereof opposite to each other,
 wherein the flanges of the inner frame and the outer frame are bent outward with respect to a center of the back frame, and
 wherein the at least one approximately U-shaped engaging plate attaches to the flanges of the inner frame and the outer frame.

6. The seat according to claim 5, wherein a pipe frame is disposed between the pair of side frames, the pipe frame including side pipe portions, and
 wherein each of side pipe portions of the pipe frame is disposed in the space between the inner frame and the outer frame of each side frame.

7. The seat according to claim 6, wherein an upper reinforcing pipe is further disposed so as to be positioned between the pair of side frames of the back frame, the upper reinforcing pipe including side pipe portions, and
 wherein each of the side pipe portions of the upper reinforcing pipe is disposed on a near side and each of the side pipe portions of the pipe frame is disposed on a far side in the space of the respective side frames through an upper end opening portion located on each of the pair of side frames.

8. The seat according to claim 6, wherein the pipe frame is partially fixed on an inner face of each of the pair of side frames.

9. The seat according to claim 5, wherein the inner frame and the outer frame of each respective side frame of the back frame are fixed at at least one point by a fastening member.

10. The seat according to claim 5, wherein the hemmed flanges of the inner frame and the outer frame of each respective side frame of the back frame are at least partially fixed to each other by adhesive agent, filler, or caulking.

11. The seat according to claim 5, wherein at least one of the inner frame and the outer frame of each respective side frame of the back frame is thermally treated.

12. The seat according to claim 1, wherein the expanded bead body is formed by applying a bead method to resin containing at least one of polystyrene, polypropylene, and polyethylene.

13. The seat according to claim 5, wherein the expanded bead body is formed by applying a bead method to resin containing at least one of polystyrene, polypropylene, and polyethylene.

* * * * *